United States Patent Office 2,965,494
Patented Dec. 20, 1960

2,965,494

PROCESS FOR THE PRESERVATION OF MEATS

Beverly E. Williams, Hillsborough, Calif., assignor to Hodges Research and Development Company, New York, N.Y., a corporation of California No Drawing. Filed July 8, 1957, Ser. No. 670,392

3 Claims. (Cl. 99—157)

This invention relates to the treatment of meat, and has particular reference to a process for the preservation of fresh meat and to the products obtained by such process.

One of the principal objects of this invention is to provide a novel process for producing fresh, prepackaged meats. Another object of this invention is to provide a process for treating meats which remain fresh for extremely long periods under non-refrigerated conditions. Another object of this invention is to provide prepackaged meats having excellent keeping qualities under conditions of ambient temperatures. Still another object of the present invention is to provide a novel process for the irradiation of meats to improve the flavor and keeping qualities thereof.

Other objects and advantages of this invention, it is believed, will be readily apparent from the following detailed description of preferred embodiments thereof.

Irradiation of fresh foodstuffs such as meats has heretofore been proven technically successful in that foodstuffs so treated do keep for indefinite periods at room or elevated temperatures. Such irradiation processes have not proven acceptable for marketable products, particularly meats, however, since meats so treated, while retaining their good appearance, have an unsatisfactory flavor. That is, they have a scorched or burned taste sometimes defined as a flavor similar to that of the "odor of a wet dog." It has been found that if the irradiation dosage is reduced below that required for optimum keeping qualities, the flavor characteristics of the meat are relatively slightly impaired. However, this has heretofore been possible only with the sacrifice of the certainty of the keeping qualities of the meat.

Briefly, this invention comprehends within its scope the discovery that meats may be preserved for keeping at normal temperatures without impairment of flavor by irradiation of the meat and then subjecting it to the action of, and packaging it with, a semi-preservative gas. The irradiation dosage is below the level at which the "wet dog" odor or flavor is imparted to the meat, and the gas treatment, preferably with a dry, substantially oxygen-free product of combustion of natural or artificial gas, propane, hexane or combinations thereof, combines synergistically with the irradiation treatment to produce a fresh meat product of excellent flavor and capable of keeping at room temperatures or higher for indefinite periods of time.

In carrying out the process of the present invention, either the gas or the irradiation treatment may precede the other, or conceivably the two steps could be carried out simultaneously. Preferably, the meat, pre-cut into steaks, roasts and the like, is first packaged in an air-tight film and a vacuum drawn on the interior of the package. The vacuum is broken with the semi-preservative gas, which contains nitrogen, carbon dioxide, carbon monoxide, and probably at least traces of hydrogen, methane, ethane and acetylene. All of the oxygen is thus removed from the hermetically sealed package and replaced with the semi-preservative gas, and the package and contents are immediately irradiated, or kept under refrigeration until irradiation at a dose level of the order of $1 \times 10^3$ to $1 \times 10^5$ rep (Roentgens equivalent physical).

The air or gas-tight film is preferably transparent for marketing and display purposes, utilizing any one of a variety of film materials such as polyethylene, polyvinyl chloride, vinylidene chloride, as well as materials used for the formation of films on the cuts in situ by dipping or spraying such as low methoxyl pectins, calcium alginates and other non-toxic or edible films of this type.

The irradiation step may be accomplished with any of a wide variety of high energy sources such as radioactive materials, gamma and beta ray sources, Van de Graaff accelerators, resonance transformer type cathode ray machines, linear electron beam accelerators, atomic piles, X-ray machines, betatrons, neutron sources, etc.

The following specific example is illustrative of the process and product of the present invention, but it is to be understood that the invention is not to be limited thereto:

A steak 1¼ inch thick was cut from a bone-in sirloin strip from a U.S. Good steer. This steak was subjected to the action of a treatment gas prepared by burning in a gas generator a "natural" fuel gas having the following analysis:

| | Percent | | Percent |
|---|---|---|---|
| Methane | 87 | Propane | 4 |
| Ethane | 8 | Butane | 1 |

The gas generator, of the Bunsen burner type, had the amount of combustion air controlled so that the products of combustion contained only traces of oxygen, preferably less than about 0.50%, and so that the carbon monoxide content of the gas was of the order of 0.5–1.5%.

The gas produced by combustion of the above natural gas analyzed as follows:

| | Percent |
|---|---|
| Carbon dioxide | 8.2 |
| Acetylene | 0.5 |
| Oxygen | 0.2–0.1 |
| Carbon monoxide | 1.0 |
| Methane | 2.2 |
| Nitrogen | 87.9 |

The steak was enveloped in a gas-tight film of a laminate of polyethylene and moisture-proof cellophane. This film was first evacuated of air and the vacuum broken with the treatment gas and the film sealed.

The gas-packaged steak was held under refrigeration between 32° F. and 45° F. until it was placed in the beam of a resonance transformer type cathode ray machine and given a radiation dosage of $35 \times 10^3$ rep at a maximum rate of $70 \times 10^3$ rep/min.

This dosage was considerably less than that required for complete sterilization of meet products, but when used at such lower dosage in conjunction with the color, flavor and keeping qualities of the gas in the oxygen-free package, it produced a steak which kept without refrigeration, maintaining its color and appearance. The steak when cooked was as good as fresh meat without the "off" flavor always heretofore associated with meats preserved by irradiation alone.

As used in the specification and claims herein, the terms "meat" and expressions similar thereto are intended to mean and include edible and inedible animal parts or products such as flesh, fat, tendons, blood, hides, eyeballs, etc.

Having fully described my invention, it is to be understood that I do not wish to be limited to the details set forth, but my invention is of the full scope of the appended claims.

I claim:
1. A process for the preservation of meats in the fresh state comprising the steps of subjecting cuts of meat to the synergistic action of an oxygen-free gaseous product of combustion, and irradiating said meat at a dose level less than that required for complete sterilization of the meat of the order of $1 \times 10^3$ to $1 \times 10^5$ rep whereby the meat keeps its taste, color, and appearance without refrigeration.

2. A process for the preservation of meats in the fresh state comprising packaging cuts of meat under an atmosphere of an oxygen-free gaseous product of combustion containing about 1% carbon monoxide, and irradiating said packaged cuts at a dose level less than that required for complete sterilization of the meat of the order of $1 \times 10^3$ to $1 \times 10^5$ rep whereby the synergistic action of the oxygen-free gaseous product of combustion and of irradiation renders the meat capable of keeping its taste, color, and appearance without refrigeration.

3. A process for the preservation of meats in the fresh state comprising packaging cuts of meat in a gas-tight transparent film under an atmosphere of an oxygen-free gaseous product of combustion containing about 1% carbon monoxide, and irradiating said packaged cuts at a dose level less than required for complete sterilization of the meat of the order of $1 \times 10^3$ to $1 \times 10^5$ rep whereby the synergistic action of the oxygen-free gaseous product of combustion and of irradiation conditions the meat to keep its taste, color, and appearance without refrigeration.

References Cited in the file of this patent

UNITED STATES PATENTS

| | | |
|---|---|---|
| 2,490,951 | Dunkley | Dec. 13, 1949 |
| 2,807,549 | Brasch et al. | Sept. 24, 1957 |

OTHER REFERENCES

"Food Technology," March 1953, pp. 109 to 115, inclusive, article entitled, "Effect of Processing Conditions on Organoleptic Changes in Foodstuffs Sterilized with High Intensity Electrons," by W. Huber et al.